(12) United States Patent
Bonnet et al.

(10) Patent No.: US 6,830,710 B2
(45) Date of Patent: Dec. 14, 2004

(54) MICROCOMPOSITE POWER BASED ON AN ELECTRICAL CONDUCTOR AND A FLUOROPOLYMER, AND OBJECTS MANUFACTURED WITH THIS POWDER

(75) Inventors: Anthony Bonnet, Serquigny (FR); Karine Triballier, Saint-Eloi-de-Fourques (FR); Philippe Bussi, Bernay (FR); Michael Burchill, Langhorne, PA (US); Michael Foure, King of Prussia, PA (US)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/988,801

(22) Filed: Nov. 20, 2001

(65) Prior Publication Data

US 2002/0136941 A1 Sep. 26, 2002

(30) Foreign Application Priority Data

Nov. 20, 2000 (FR) .............................................. 00 14934
Jun. 25, 2001 (FR) .............................................. 01 08333

(51) Int. Cl.$^7$ ............................ H01B 1/06; H01M 6/48; B32B 9/00
(52) U.S. Cl. ................... 252/511; 252/502; 252/518.1; 428/407; 428/402; 429/210; 429/212; 429/316; 427/115; 427/222
(58) Field of Search .............................. 252/511, 502, 252/518.1; 428/407, 402, 372; 429/210, 212, 316; 427/115, 222, 249.14

(56) References Cited

U.S. PATENT DOCUMENTS

| | | | |
|---|---|---|---|
| 4,177,159 A | * 12/1979 | Singer | .................... 502/101 |
| 4,212,969 A | 7/1980 | Wissner | |
| 4,554,063 A | * 11/1985 | Braun et al. | ................. 204/254 |
| 5,242,765 A | 9/1993 | Naimer et al. | |
| 5,312,701 A | 5/1994 | Khasin et al. | |
| 5,441,823 A | 8/1995 | Naimer et al. | |
| 5,494,752 A | * 2/1996 | Shimizu et al. | ............. 428/407 |
| 5,496,675 A | * 3/1996 | Van Dusen et al. | ...... 430/137.13 |
| 5,738,905 A | * 4/1998 | Bevers | ....................... 427/115 |
| 5,789,108 A | * 8/1998 | Chu | ........................... 429/213 |
| 6,051,343 A | * 4/2000 | Suzuki et al. | ............... 429/316 |
| 6,103,373 A | * 8/2000 | Nishimura et al. | ......... 428/368 |
| 6,156,839 A | * 12/2000 | Wu et al. | .................... 524/795 |
| 6,298,209 B1 | * 10/2001 | Kelly et al. | ................. 399/266 |
| 6,511,767 B1 | * 1/2003 | Calver et al. | ................. 429/42 |

FOREIGN PATENT DOCUMENTS

EP 456018 * 11/1991 ............ C09D/5/03

* cited by examiner

Primary Examiner—Mark Kopec
Assistant Examiner—Kallambella Vijayakumar
(74) Attorney, Agent, or Firm—Millen, White, Zelano, Branigan, P.C.

(57) ABSTRACT

The present invention relates to a microcomposite powder comprising particles from 1 um to 300 um of an electrically conductive product, which are coated with particles from 0.1 $\mu$m to 0.5 $\mu$m of a fluoropolymer. According to one advantageous form of the invention the microcomposite powder comprises a product (A) which is a polymer or an oligomer which can be dissolved with a solvent which is not a solvent for the fluoropolymer or for the electrically conductive product. The present invention also relates to objects consisting of this powder. These objects may be bipolar plates for fuel cells, or supercapacitor components.

19 Claims, 4 Drawing Sheets

MICROCOMPOSITE POWER BASED ON AN ELECTRICAL CONDUCTOR AND A FLUOROPOLYMER, AND OBJECTS MANUFACTURED WITH THIS POWDER

FIELD OF THE INVENTION

The present invention relates to a microcomposite powder based on an electrical conductor (for example carbon) and a fluoropolymer, as well as to objects manufactured with this powder. More specifically, the microcomposite powder consists of particles of the order of 0.1 µm to 0.5 µm in size, made of fluoropolymer, which is advantageously PVDF, fixed to an electrically conductive element of the order of 1 µm to 300 µm in size which is advantageously graphite, a carbon black aggregate, a carbon fibre, an active charcoal or carbon nanotubes. This powder may be obtained by co-atomization.

It is particularly useful for producing bipolar plates used in fuel cells. Fuel cells, which consist of these bipolar plates, are subject to severe working conditions in terms of pressure, temperature and chemical and electrochemical attack. These bipolar plates must thus be able to withstand these various conditions and also be able to be handled easily during assembly of the fuel cell. Several types of functioning of fuel cells exist, which generate different performance specifications as regards the characteristics the bipolar plates need to have in terms of conductivity, mechanical strength and permeability.

BACKGROUND OF THE INVENTION

Patent DE 3538732 discloses an electrode made from a spreadable paste consisting of 70% to 80% by mass of carbon powder with granules 30 to 300 µm in size and from 10% to 20% by mass of a PVDF solution containing 4% to 8% PVDF in DMF (dimethylformamide) and at least 5% by mass of PTFE powder with granules 10 to 100 µm in size. The paste is spread on an aluminium substrate and then dried with an infrared lamp for ½ h to 4 h. This electrode based on PVDF and carbon is permeable to gases and liquids.

Patent application JP 08031231 A discloses a formulation based on spherical graphites, thermosetting or thermoplastic agent and carbon black such as conductive ketjenblack. The material shows good mechanical strength and can be used for moulding and calendering. This material can be used in the fuel cell field.

Patent application JP 04013287 A discloses a carbon plate which is porous in the three dimensions with a level of 60% to 80% porosity.

Patent application JP 52122276 A discloses an electrode prepared by the deposition onto a porous textile of pyrolysed anisotropic carbon, which itself is coated with an aqueous dispersion of Teflon® (PTFE) and the whole assembly is dried to form a hydrophobic porous layer.

Patent application WO 2000/25372 discloses a bipolar plate for use in the fuel cell field, which is obtained from the moulding of a vinyl ester resin and a graphite powder, making it possible to obtain a conductivity of at least 10 S/cm. These plates can contain from 20% to 95% graphite and from 0% to 5% carbon black, along with cotton fibres. The use of fluoro products to improve the removal from the mould and the hydrophobicity are also disclosed therein.

Patent U.S. Pat. No. 5,268,239 discloses the preparation of a separating plate. This graphite-based plate is a mixture containing from 25% to 75% by mass of graphite and from 25% to 75% by mass of phenolic resin. This plate is then pyrolyzed at between 800° C. and 1000° C. and then treated with graphite at between 2300° C. and 3000° C. The said patent also discloses the application of a fluoropolymer film to avoid the migration of the electrolyte.

Patent application WO 2000/24075 discloses the preparation of a substrate which can be used to prepare a membrane, this substrate comprising a porous fibre matrix, characterized in that the fibres are bonded with silica and a fluoropolymer. The process is also disclosed, with, in a first stage, the dispersion of the fibres in water and then, in a second stage, the deposition of this dispersion to form a network. The fibre network is then dried and compacted. An aqueous dispersion of fluoropolymer may be introduced before or after this drying and compacting step.

Patent FR-A-2 355 381 discloses a process for preparing an electrode for fuel cells, characterized by the following steps: (i) first, the formation of an aqueous suspension of catalyst particles, with addition of a cationic surfactant, then (ii) formation of a second colloidal aqueous suspension of hydrophobic polymer, (iii) mixing of the two suspensions to form a uniform aqueous suspension of catalyst particles and of hydrophobic polymer particles. This suspension is then deposited on a conductive support and heated so as to sinter the layer of catalyst and polymer.

Patent FR-A-2 430 100 discloses a process for preparing a finely divided dry powder, characterized in that it consists of grains having a maximum size of about 5 µm. This powder comprises precatalysed carbon and a hydrophobic fluorocarbon-based polymer, for example PTFE. This powder is obtained by flocculating a co-suspension of the precatalysed carbon grains and the polymer grains.

Patent EP-A-0 948 071 discloses a method for producing an electrode for fuel cells, and also a catalytic powder prepared by mixing a fine carbon powder supporting a catalytic metal with a colloidal dispersion of a polymer. The suspension thus obtained is dried.

Patent EP-A-0 557 259 discloses the preparation of a gas diffusion electrode for an electrochemical cell. This electrode is prepared using a carbon black powder dispersed in an organic solvent in the presence of soluble polyethylene. The dispersion is then dried, which allows the polyethylene to cover the surface of the black. This polyethylene is then fluorinated. This hydrophobic carbon black powder is then mixed with a carbon black of acetylenic type supporting a metal catalyst and PTFE to form aggregates. These aggregates are then pressed at 20 kg/cm$^2$ and sintered at 340° C. for 20 minutes.

Patent EP-A-0 928 036 discloses a method for preparing a gas-permeable electrode by preparing a dispersion of carbon black particles or of carbon black supporting a catalyst, using high-shear equipment to homogenize it, such as microfluidizers, and then adding a binder to the dispersion obtained, followed by a stabilizer. This mixture is then deposited on an electrically conductive fabric, after which it is dried and sintered at 300–400° C.

Patent application WO 2000/30202 discloses a mouldable composition for preparing current-collector plates by compression moulding or injection moulding. This composition comprises a non-fluoro polymer binder; among the polymers which may be used are polyphenylene sulphides, modified polyphenylene ethers, liquid crystal polymers, polyamides, polyimides, polyesters, phenolic resins, epoxy resins and vinyl esters. Among the conductive particles are, more particularly, carbon-based particles. These carbon-based particles are present in a proportion of at least 45% by mass.

Makoto Ushida in J. Electrochem. Soc., vol.142, No. 12, December 1995 has studied the preparation of an MEA (membrane and electrode assembly), based on the formation of a colloid for optimizing the formation of a network in the layer of catalyst and for simplifying the manufacture of the MEA. The preparation by producing, for example, a mixture of perfluorosulfonate ionomer (PFSI) dissolved in ethanol receives an addition of butyl acetate (a poor solvent) to form a colloidal solution. Next, a carbon supporting platinum is mixed with a carbon coated with PTFE. This PTFE-coated carbon is prepared by mixing a carbon suspension and a PTFE suspension along with a surfactant, and the surfactant is then removed during a treatment in air at 290° C. The mixture of the two powders Pt/C and C/PTFE is added to the PFSI colloidal solution, which gives rise to crosslinking of the PFSI chains adsorbed by the carbon, this crosslinking being promoted by a treatment with ultrasound. This colloidal suspension is then spread onto a carbon paper which is pressed at 130° C. and 7.5 MPA for 1 minute.

In Journal of Applied Electrochimstry 28 (1998), pp. 277–282, Fischer studied the preparation of MEA by spraying a mixture of a slurry (suspension) of a metal catalyst, a solution of Nafion® (fluoroacrylate) in water and glycerol, onto a heated membrane based on Nafion 117®. The solvents are then evaporated off by heating to 150° C.

Patent U.S. Pat. No. 4,214,969 discloses a bipolar plate for fuel cells, consisting of graphite and fluoropolymer in a ratio from 2.5:1 to 16:1. These bipolar plates have a volume conductivity of $4 \times 10^{-3}$ $\Omega$.in. This mixture of graphite and fluoropolymer is dry-blended in a blender for 25 minutes and then introduced into a hot mould under pressure.

Patent application GB-A-2 220 666 discloses a co-atomization method for preparing carbon black particles coated very uniformly with synthetic latex particles. No fluoropolymer is mentioned in the description or in the examples.

The prior art has essentially disclosed the preparation of bipolar plates by batchwise processes using solvents or processes which involve only coarse blends of the various products used to prepare the plates. The prior art disclosing a co-atomization did not disclose fluoropolymers.

SUMMARY OF THE INVENTION

A highly homogeneous microcomposite powder based on a fluoropolymer and an electrical conductor has now been found, and this powder can be used in techniques such as injection, injection transfer and injection moulding which are usually used for thermoplastics. The articles thus manufactured are useful in fuel cells (bipolar plates) and supercapacitors.

This microcomposite powder may be produced by co-atomization of an aqueous dispersion comprising a fluoropolymer and an electrical conductor. The process does not involve any solvent other than water. The advantages and other characteristics of the present invention are outlined in the detailed description of the invention which follows.

The present invention relates to a microcomposite powder comprising particles of from 1 $\mu$m to 300 $\mu$m of an electrically conductive product, which are coated with particles of from 0.1 $\mu$m to 0.5 $\mu$m of a fluoropolymer.

According to one advantageous form of the invention the microcomposite powder comprises a product (A) which is a polymer or an oligomer which can be dissolved with a solvent which is not a solvent for the fluoropolymer or for the electrically conductive product.

The present invention also relates to objects consisting of this powder. These objects may be bipolar plates for fuel cells, or supercapacitor components.

Upon further study of the specification and appended claims, further objects and advantages of this invention will become apparent to those skilled in the art.

As regards the electrically conductive element, this is any conductor of electricity. Examples which may be mentioned are metals, metal oxides and carbon-based products. Examples of carbon-based products which may be mentioned are graphite, carbon black aggregates, carbon fibres, active charcoals and carbon nanotubes. It would not constitute a departure from the context of the invention to use several electrically conductive elements, for example: (i) graphite and carbon black aggregates; (ii) graphite, carbon black aggregates and carbon fibres; (iii) carbon black aggregates and carbon fibres; (iv) graphite and carbon fibres.

The carbon-based products which may be used are disclosed in Handbook of Fillers $2^{nd}$ Edition published by Chem Tec Publishing 1999 page 62 §2.1.22, page 92 §2.1.33 and page 184 § 2.2.2. Preferably, graphites between 20 $\mu$m and 50 $\mu$m in size may be used. Among the carbon blacks which may be used, mention may be made of the blacks Ketjen® EC600 JD with a specific surface area of 1250 $m^2$/gr and Ketien® EC 300 J, with a specific surface area of 800 $m^2$/gr. Carbon fibres 150 $\mu$m long may advantageously be used.

As regards the fluoropolymer, any polymer which has in its chain at least one monomer chosen from compounds containing a vinyl group capable of opening to polymerize and which contains, directly attached to this vinyl group, at least one fluorine atom, a fluoroalkyl group or a fluoroalkoxy group, is thus denoted.

Examples of monomers which may be mentioned include vinyl fluoride; vinylidene fluoride (VF2); trifluoroethylene (VF3); chlorotrifluoroethylene (CTFE); 1,2-difluoroethylene; tetrafluoroethylene (TFE); hexafluoropropylene (HFP); perfluoro(alkyl vinyl)ethers such as perfluoro (methyl vinyl)ether (PMVE), perfluoro(ethyl vinyl)ether (PEVE) and perfluoro(propyl vinyl)ether (PPVE); perfluoro (1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)nCH_2OCF=CF_2$ in which n is 1, 2, 3, 4 or 5; the product of formula $R1CH_2OCF=CF_2$ in which R1 is hydrogen or $F(CF_2)z$ and z is 1, 2, 3 or 4; the product of formula $R3OCF=CH_2$ in which R3 is $F(CF_2)z$- and z is 1, 2, 3 or 4; perfluorobutylethylene (PFBE); 3,3,3-trifluoropropene and 2-trifluoromethyl-3,3,3-trifluoro-1-propene.

The fluoropolymer may be a homopolymer or a copolymer, and may also comprise non-fluoro monomers such as ethylene. The fluoropolymer is advantageously PVDF homopolymer or copolymer containing at least 60% by weight of VF2, the optional comonomer being chosen from the fluoro monomers mentioned above and is advantageously HFP. The fluoropolymer may contain plasticizers or additives such as, for example, a well-known plasticizer, dibutyl sebacate.

The microcomposite powder may comprise, by weight, 10% to 40% of fluoropolymer per 90% to 60%, respectively, of electrically conductive product. The powder advantageously comprises 15% to 30% of fluoropolymer per 85% to 70%, respectively, of electrically conductive product. In the above proportions, this concerns fluoropolymer optionally containing plasticizers or additives. The microcomposite powder may also contain up to 5 parts by weight per 100 parts of the assembly consisting of the fluoropolymer and the electrically conductive product, of a porogen. Examples of porogens which may be mentioned include calcium carbonate and azobiscarbonamide.

The microcomposite powder is in the form of particles of electrically conductive product advantageously coated uniformly with fluoropolymer particles. The fluoropolymer particles may partially or totally coat the particles of electrically conductive product. The powder also contains the optional porogen.

The microcomposite powder may be manufactured by (co)atomization of one or more aqueous dispersions or emulsions containing its various constituents. For example, the microcomposite powder of the invention may be manufactured by co-atomization between a fluoropolymer latex (an emulsion or a suspension) and an aqueous dispersion of electrically conductive product. The latex and the dispersion are introduced into the co-atomization head according to the usual techniques. Before co-atomization, it is also possible to make a mixture by introducing the electrically conductive product directly into the fluoropolymer latex, or alternatively to mix a dispersion of the electrically conductive product and the fluoropolymer latex. The atomization consists in spraying an aqueous dispersion (or a suspension), or even a solution, in a stream of hot air to remove the water and to recover the dissolved, dispersed or suspended products.

According to one advantageous form of the invention, the microcomposite powder comprises a product (A) which is a polymer or oligomer which may be dissolved with a solvent which is not a solvent for the fluoropolymer or for the electrically conductive product. An example of (A) which may be mentioned is poly(oxyethylene)glycol, commonly known as polyethylene glycol (PEG), advantageously with a mass $\overline{Mn}$ of between 400 and 15,000 g/mol and a melting point of between 50° C. and 80° C. Examples of PEG which may be mentioned are Pluriol E® from the company BASF and Polyglykol® 1500 from the company Clariant. The microcomposite powder thus consists of an electrically conductive product coated with fluoropolymer particles and (A). The microcomposite powder may also contain up to 30 parts by weight per 100 parts of the assembly consisting of the fluoropolymer and the electrically conductive product.

This powder may be manufactured by co-atomization as described above for the powders without polymer (A); it suffices to add (A) to the fluoropolymer latex or to the dispersion of the electrically conductive product. (A) then becomes deposited on the graphite by precipitation in the form of a filament which can link certain electrically conductive particles. The advantage of the presence of (A) is that, once an object has been manufactured, it suffices to immerse it in water to remove (A) and create additional porosity.

As regards the objects consisting of this powder, it suffices to extrude this powder with a low-shear screw profile at a temperature which is sufficient for the fluoropolymer to be in molten form, for example 15° C. to 30° C. above its melting point. This powder can also be injected into an injection press with a screw having a profile of PVC type and being at a temperature which is sufficient for the fluoropolymer to be in molten form, for example 15° C. to 40° C. above its melting point. As regards PVDF, it suffices to extrude this powder at 230° C. on a co-rotating or counter-rotating twin-screw extruder with a low-shear screw profile, or to inject it at 240° C. in an injection press with a screw having a profile of PVC type.

The bipolar plates obtained using the above microcomposite powder can have a mass per unit volume ranging from 500 to 3000 kg/m$^3$, a resistivity of between 0.01 and 1 Ω.cm in volume resistivity and from 0.01 to 0.5Ω in surface resistivity. The flexural modulus of the bipolar plates may be between 1000 and 12,000 MPa and the flexural breaking stress is between 1 and 50 MPa. These characteristics are obtained by adjusting the proportions and nature of the constituents.

EXAMPLES

Example 1

(According to the Invention) Permeable Plate

The starting materials used are a Kynar® 9000 latex from the company Atofina, with a solids content of 25.4%, and a graphite dispersion prepared according to the following procedure:
The following products are used:
Kynar® 9000 is a PVDF homopolymer with an MVFR (Melt Volume Flow Rate) of 10 cm$^3$/10 min at 230° C. under 5 kg.
A Kynar® 9000 latex (solids content=25.4%), a carbon-based element, graphite, an antifoam (Byc 019) and a surfactant (Coadis 123K).

The graphite dispersion is prepared by mixing the water, the surfactant and the antifoam, followed, after dissolution, by adding the filler with vigorous stirring, aiming at a high solids content (50%). The latex is added with moderate stirring and the mixture is then completed with water to obtain a readily pumpable liquid dispersion having an SC (solids content) of 20%. The composition of the graphite dispersion is given below: 2.245 kg of water, 1.16 g of antifoam, 0.3 kg of surfactant (moderate stirring), followed by addition of 2.4 kg of graphite. Stir until a liquid solution is obtained which does not separate by settling. Add 2.33 kg of Kynar 9000 PVDF latex and 8.1 kg of water.

The graphite dispersion/PVDF latex mixture is subsequently pumped with moderate stirring and then co-atomized under the following operating conditions:
Co-atomizer inlet temperature: 170° C.
Co-atomizer outlet temperature: 60° C.
Total flow rate: 17 kg/h.

The co-atomization, on a Minor Production® atomizer from the company Niro, of the PVDF latex particles and the graphite particles allows the preparation of 2.55 kg of microcomposite powder with a composition of 80% by mass of graphite and 20% by mass of PVDF.

Figure 1:
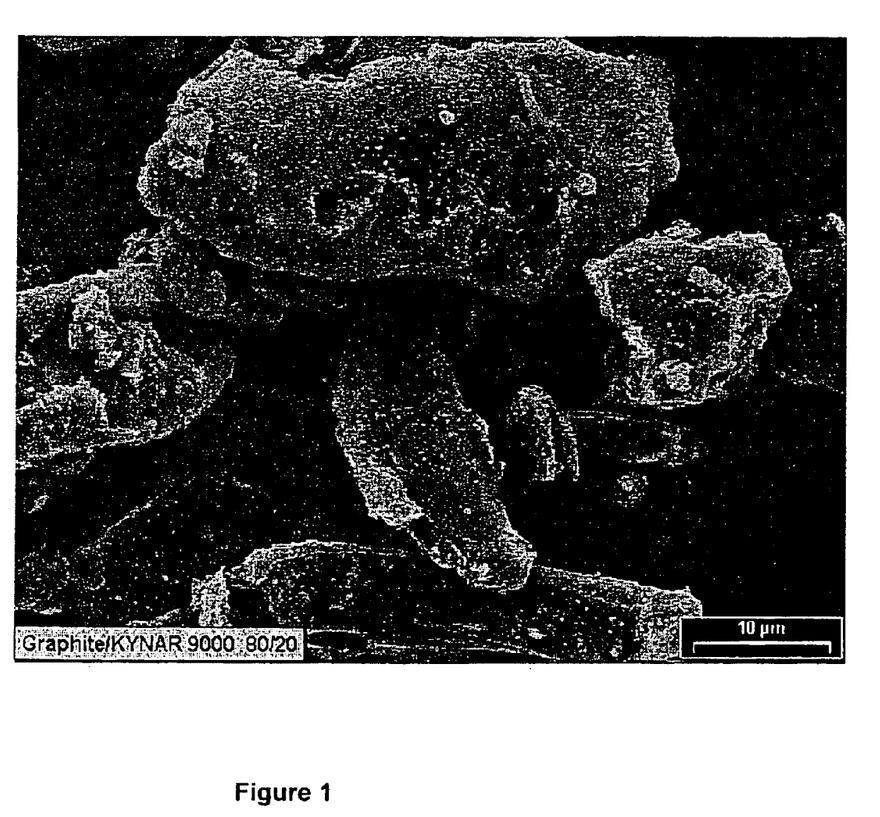
FIG. 1 is a photograph of the microcomposite powder obtained in Example 1 before pressing.

This microcomposite powder is pressed at 80 kg/cm$^2$, the plate obtained having a mass per unit volume of 1140 kg/m$^3$. This plate is permeable to water and air and has a volume resistivity of 0.14 Ω.cm. FIG. 1 represents a photograph of the microcomposite powder obtained before pressing. 10 to 30 μm graphite particles coated with small beads of PVDF are seen therein.

Example 2

(According to the Invention) Dense Plate

The starting materials used are a Kynar® 1000 latex from the company Atofina, with a solids content of 25%, and a graphite dispersion prepared according to the following procedure:
The following products are used:
Kynar®1000 is a PVDF homopolymer with an MVFR (Melt Volume Flow Rate) of 1.1 cm$^3$/10 min at 230° C. under 5 kg.

A Kynar 1000 latex (solids content=25%), a carbon-based element, graphite, an antifoam (Byc 019) and a surfactant (Coadis 123K).

A graphite dispersion is prepared by mixing the water, the surfactant and the antifoam, followed, after dissolution, by addition of the filler with vigorous stirring, aiming at a high solids content (50%). The latex is added with moderate stirring and the mixture is then completed with water to obtain a readily pumpable liquid dispersion (SC=20%). The composition of the graphite dispersion is given below: 973 g of water, 0.5 g of antifoam, 129.8 g of surfactant (moderate stirring), followed by addition of 1040 g of graphite. Stir vigorously until a liquid solution is obtained which does not separate by settling. Add 1040 g of Kynar 1000 PVDF latex and 3475.1 g of water, with moderate stirring.

The graphite dispersion/PVDF latex mixture thus prepared is subsequently pumped with moderate stirring and then co-atomized using the following operating conditions:

Co-atomizer inlet temperature: 170° C.

Co-atomizer outlet temperature: 60° C.

Total flow rate: 17 kg/h.

Figure 2:
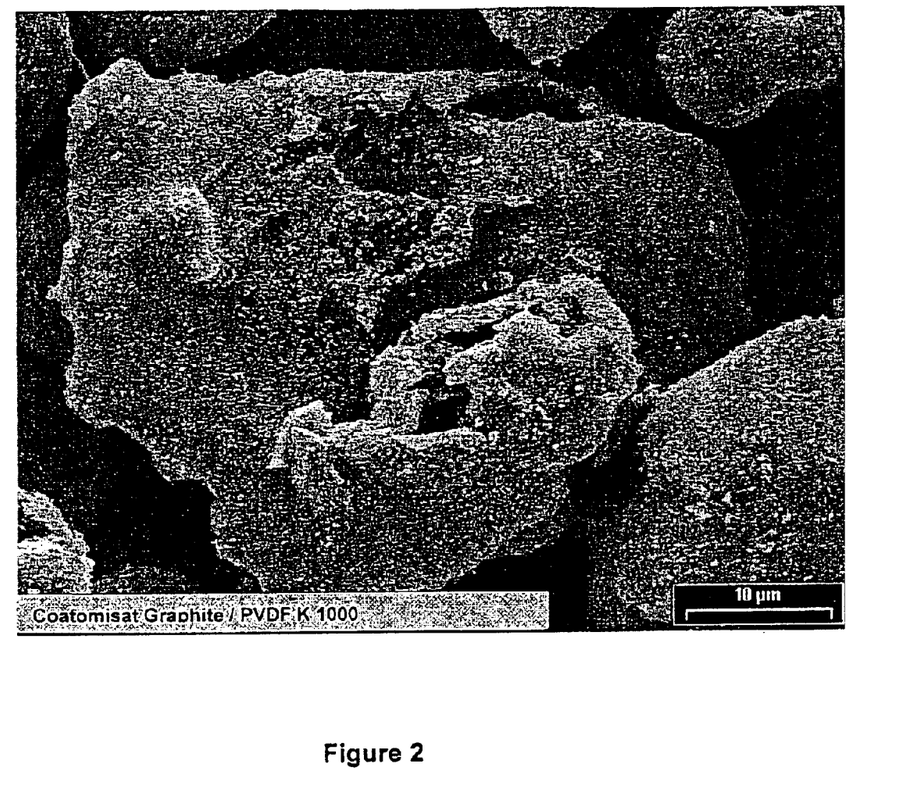
FIG. 2 is a photograph of the microcomposite powder obtained in Example 2 before pressing.

Co-atomization, on a Minor Production® atomizer from the company Niro, of the PVDF latex particles and the graphite particles allows the preparation of 1000 g of microcomposite powder having a composition of 80% by mass of graphite and 20% by mass of PVDF. This microcomposite powder is pressed, the plate obtained having a mass per unit volume of 1630 kg/m³. This plate is sparingly permeable to water and air and has a volume resistivity of 0.066 Ω.cm. FIG. 2 represents a photograph of the microcomposite powder obtained before pressing. 10 to 30 µm graphite particles coated with small beads of PVDF are seen therein.

Example 3

(According to the Invention) Permeable Plate with Improved Conductivity

The starting materials used are a Kynar® 9000 latex from the company Atofina, with a solids content of 20.8%, and a graphite dispersion prepared according to the following procedure:

The following products are used:

A Kynar 9000 latex (solids content=20.8%), a carbon-based element, graphite, an antifoam, a surfactant and a carbon black.

A dispersion of graphite and carbon black (Ketjen®) EC 600 JD) is prepared by mixing the water, the surfactant (Coadis 123K), and the antifoam (Byc 019), followed, after dissolution, by adding the fillers (graphite and carbon black) with vigorous stirring, aiming at a high solids content (50%). The latex is added with moderate stirring and the mixture is then completed with water to obtain a readily pumpable liquid dispersion (SC=20%). The composition of the graphite dispersion is given below: 373.87 g of water, 0.19 g of antifoam, 49.9 g of surfactant (moderate stirring), followed by addition of 397.5 g of graphite and 2.5 g of carbon black. Stir vigorously until a liquid solution is obtained which does not separate by settling. Add 479.8 g of Kynar 9000 PVDF latex and 1256.74 g of water, with moderate stirring.

The graphite dispersion/PVDF latex mixture thus prepared is subsequently pumped with moderate stirring and then co-atomized on a Minor Mobile® atomizer from the company Niro, using the following operating conditions:

Co-atomizer inlet temperature: 185° C.

Co-atomizer outlet temperature: 65° C.

Compresseed air: 2.4 bar

Figure 3:
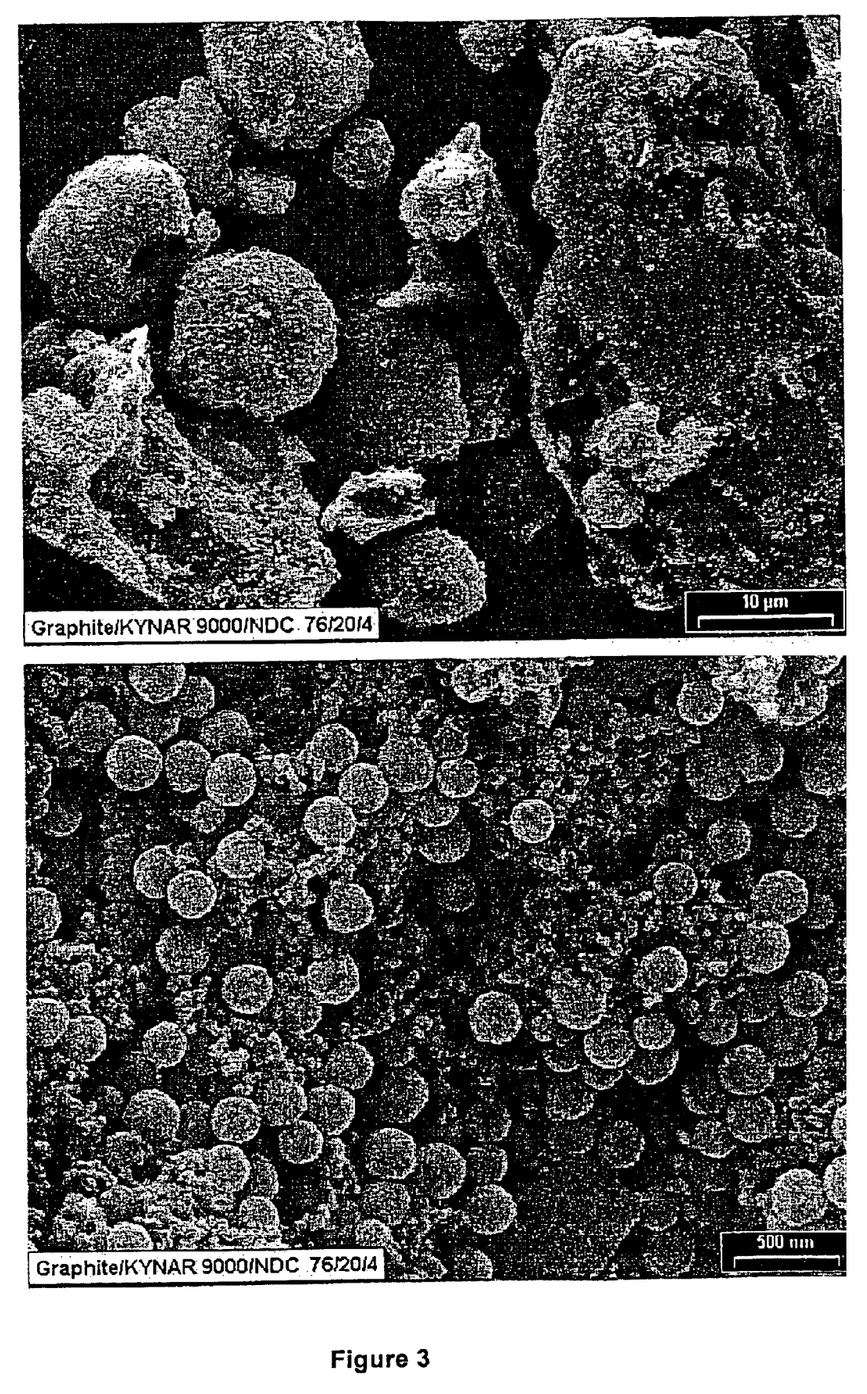
FIG. 3 is, on the top, a photograph of the microcomposite powder obtained in Example 3 before pressing and, on the bottom, an enlarged photograph of a portion of the surface of graphite coated with PVDF particles and carbon black aggregates.

The co-atomization of the PVDF latex particles and the graphite particles allows the preparation of 395 g of microcomposite powder having a composition of 20% by mass of PVDF, 79.5% by mass of graphite and 0.5% of carbon black. The mass per unit volume is 1210 kg/m³ and the volume resistivity is 0.078 Ω.cm. FIG. 3 shows (at the top) a photograph of the powder before pressing and, at the bottom, an enlarged photograph of a portion of the surface of a graphite particle coated with PVDF particles (large white beads) and with carbon black aggregates (small clustered beads).

Example 4

(According to the Invention) Permeable Plate

The starting materials are a Kynar® 9000 latex from the company Atofina, with a solids content of 21%, and a graphite dispersion prepared according to the following procedure:

The following products are used:

A Kynar 9000 latex (solids content=21%), a carbon-based element, graphite, an antifoam, a surfactant and PEG (Polyglykol® 1500 polyethylene glycol from the company Clariant).

A graphite dispersion is prepared by mixing the water, the surfactant (Coadis 123K) and the antifoam (Byc 019), followed, after dissolution, by adding the filler with vigorous stirring, aiming at a high solids content (50%). The latex is added with moderate stirring, followed by water, and the mixture is then completed with an aqueous PEG solution with a solids content of 20%, to obtain a readily pumpable liquid dispersion (SC=20%). The composition of the graphite dispersion is given below: 327.44 g of water, 0.17 g of antifoam, 43.7 g of surfactant (moderate stirring), followed by addition of 350 g of graphite. Stir vigorously until a liquid solution is obtained which does not separate by settling. Add 416.7 g of Kynar 9000 PVDF latex and 1102.75 g of water, with moderate stirring. After preparing this slurry, 62.5 g of PEG dissolved in 250 g of water are added.

The graphite dispersion/PVDF latex mixture thus prepared is subsequently pumped with moderate stirring and then co-atomized on a Minor Mobile® atomizer from the company Niro, using the following operating conditions:

Co-atomizer inlet temperature: 185° C.

Co-atomizer outlet temperature: 65° C.

Compressed air: 2.4 bar

Figure 4:
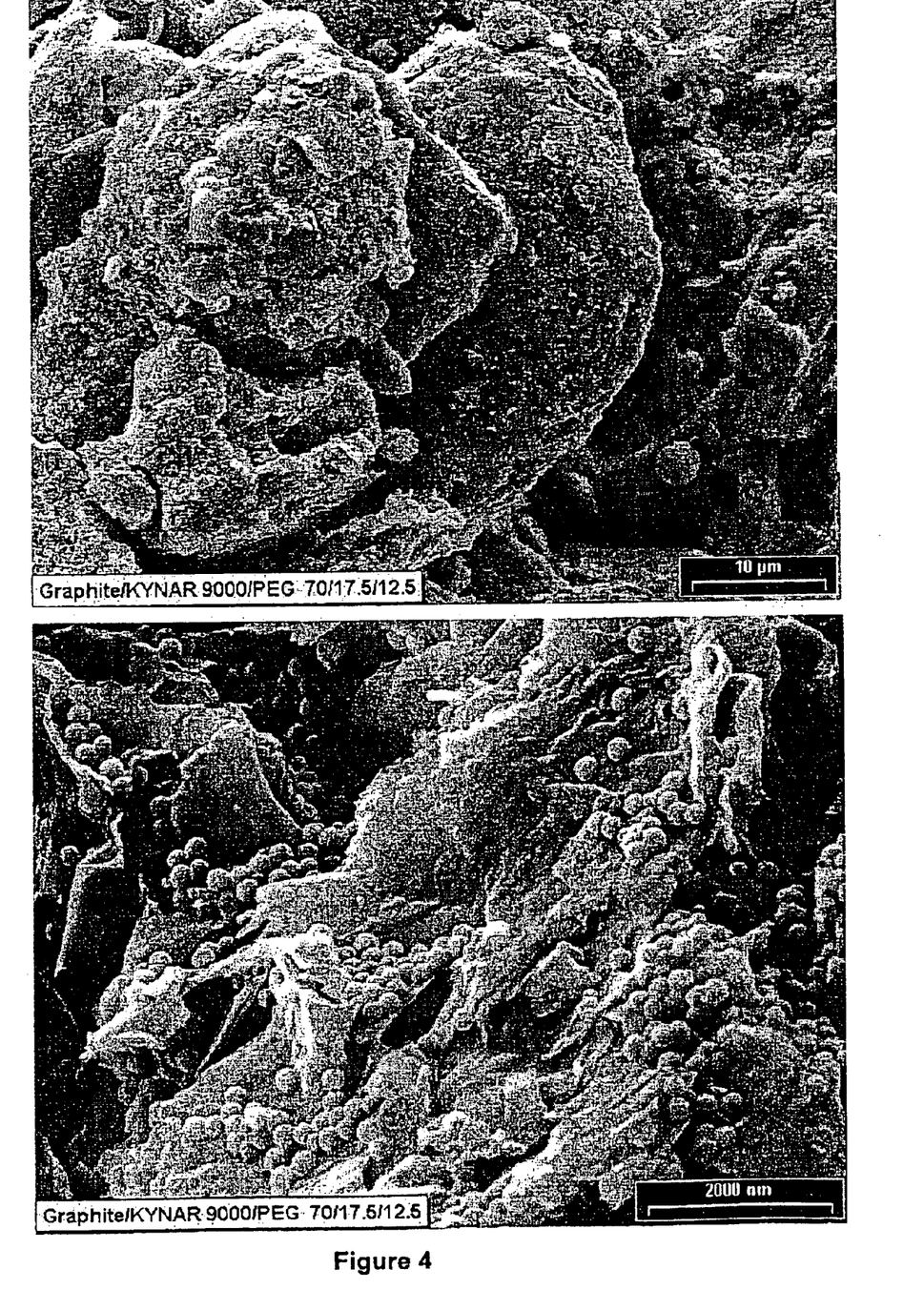
FIG. 4 is, on the top, a photograph of the microcomposite powder obtained in Example 4 before pressing and, on the bottom, an enlarged photograph of the surface of a graphite particle with PVDF particles and PEG filaments precipitated during atomization.

The co-atomization of the PVDF latex particles and the graphite particles allows the preparation of 375 g of microcomposite powder having a composition of 17.5% by mass of PVDF, 70% by mass of graphite and 12.5% of PEG. This microcomposite powder is pressed at 80 kg/cm², the plate obtained having a mass per unit volume of 1410 kg/m³. This plate is immersed in water at 14.4° C. for 113.8 hours. After drying at 50° C. in an oven the plate has a density of 1210 kg/M³. This plate is permeable to air and water and has a resistivity of 0.073 Ω.cm. FIG. 4 shows (top photograph) a photograph of the microcomposite powder before pressing and, at the bottom, an enlarged photograph of the surface of a graphite particle, in which can be seen the PVDF particles (the beads) and also the PEG filaments precipitated during the atomization.

Example 5

(According to the Invention) Permeable Plate

The starting materials are a Kynar® 9000 latex from the company Atofina, with a solids content of 21%, and a graphite dispersion prepared according to the following procedure:

The following products are used:

A Kynar 9000 latex (solids content=21%), a carbon-based element, graphite, an antifoam, a surfactant and PEG (Polyglykol® 1500 polyethylene glycol from the company Clariant).

A graphite dispersion is prepared by mixing the water, the surfactant (Coadis 123K) and the antifoam (Byc 019), followed, after dissolution, by adding the filler with vigorous stirring, aiming at a high solids content (50%). The latex is added with moderate stirring, followed by water, and the mixture is then completed with an aqueous PEG solution with an SC of 20%, to obtain a readily pumpable liquid dispersion (SC=20%). The composition of the graphite dispersion is given below: 311.5 g of water, 0.5 g of antifoam, 41.4 g of surfactant (moderate stirring), followed by addition of 332.5 g of graphite. Stir vigorously until a liquid solution is obtained which does not separate by settling. Add 395.2 g of Kynar 9000 PVDF latex and 1132.9 g of water, with moderate before pressing. graphite particle with PVDF particles and PEG filaments precipitated during atomization. stirring. After preparing this slurry, 84.5 g of PEG dissolved in 253.5 g of water are added. The graphite dispersion/PVDF latex mixture thus prepared is subsequently pumped with moderate stirring and then co-atomized on a Minor Mobile® atomizer from the company Niro, using the following operating conditions:

Co-atomizer inlet temperature: 160° C.

Co-atomizer outlet temperature: 60° C.

Compressed air: 2.4 bar

The co-atomization of the PVDF latex particles and the graphite particles allows the preparation of 297.5 g of microcomposite powder having a composition of 16.6% by mass of PVDF, 66.5% by mass of graphite and 16.9% of PEG. This microcomposite powder is fed into a full hopper in a ZSK co-rotating twin-screw extruder with a 3.5 mm die. The extrusion is carried out without difficulty at 230° C., 30 rpm and a torque of 15 N.m.

The rod obtained has a density of 1500 kg/m³.

Example 6

According to the Invention

The process is performed as in Example 4, adding black to the formulation. The microcomposite powder thus prepared has a composition of 17.5% by mass of PVDF, 69.5% by mass of graphite, 12.5% of PEG and 0.5% of carbon black.

The entire disclosures of all applications, patents and publications, cited above or below, and of corresponding French application No. 0014934, filed Nov. 20, 2000 and French application No. 0108333, filed Jun. 25, 2001 are hereby incorporated by reference.

What is claimed is:

1. A microcomposite powder comprising particles of from 1 um to 300 um of an electrically conductive product partially or totally coated with particles from 0.1 um to 0.5 um of a fluoropolymer which is a polyvinylidene fluoride homopolymer or copolymer containing at least 60% by weight of vinylidene fluoride.

2. Powder according to claim 1, wherein the electrically conductive product is a carbon-based product.

3. Powder according to claim 1, wherein the electrically conductive product is graphite, carbon black aggregates, carbon fibers, active charcoal or carbon nanotubes.

4. A powder of claim 1, wherein the electrically conductive product is a metal or metal oxide.

5. Powder according to claim 1, wherein the electrically conductive product is a mixture of: (1) graphite and carbon black aggregates, (ii) graphite, carbon black aggregates and carbon fibers, (iii) carbon black aggregates and carbon fibers, or (iv) graphite and carbon fibers.

6. Powder according to claim 1, in which the proportions of particles are, by weight, from 10% to 40% of fluoropolymer per 90% to 60% respectively, of electrically conductive product.

7. Powder according to claim 1, in which the proportions of particles are, by weight, from 15% to 30% of fluoropolymer per 85% to 70% respectively, of electrically conductive product.

8. Powder according to claim 1, further comprising up to 5 parts by weight of a porogen per 100 parts by weight of the fluoropolymer and the electrically conductive product combined.

9. A powder of claim 8, wherein the porogen is calcium carbonate or azobiscarbonamide.

10. Powder according to claim 1, further comprising a product (A), which is a polymer or an oligomer, which can be dissolved with a solvent, which is not a solvent for the fluoropolymer or for the electrically conductive product.

11. Powder according to claim 10, containing up to 30 parts by weight of product (A) per 100 parts by weight of the fluoropolymer and the electrically conductive product combined.

12. Powder according to claim 10, in which product (A) is a polyethylene glycol.

13. Powder according to claim 10, in which product (A) is deposited on graphite by precipitation in the form of filaments, which are capable of linking at least some of the electrically conductive particles.

14. An article, which contains a powder of claim 1.

15. An article according to claim 14, which is a bipolar plate of fuel cells, or supercapacitor components.

16. A bipolar plate which contains a microcomposite powder according to claim 1, having a mass per unit volume from 500 to 3000 kg/m³ and a resistivity from 0.01 to 1 Ωcm in volume resistivity and from 0.01 to 0.5 Ω in surface resistivity.

17. A bipolar plate according to claim 16, having a flexural modulus from 1,000 to 12,000 Mpa.

18. A bipolar plate according to claim 16, having a flexural breaking stress from 1 to 50 Mpa.

19. A process for preparing the powder of claim 1, by (co)atomizing one or more aqueous dispersions or emulsions containing the electrically conductive product and the fluoropolymer.

* * * * *

UNITED STATES PATENT AND TRADEMARK OFFICE
CERTIFICATE OF CORRECTION

PATENT NO. : 6,830,710 B2
DATED : December 14, 2004
INVENTOR(S) : Anthony Bonnet It is certified that error appears in the above-identified patent and that said Letters Patent is hereby corrected as shown below:

Title page,
Item [54], Title, delete "POWER" and insert -- POWDER --
Item [75], Inventors, delete "Michael" and insert -- Michel --

Column 9,
Lines 54, 55 and 56, delete "um" and insert -- $\mu$m --,

Column 10,
Lines 32, 35 and 37, delete "product".

Signed and Sealed this

Tenth Day of May, 2005

JON W. DUDAS
*Director of the United States Patent and Trademark Office*